(12) United States Patent
Hirai et al.

(10) Patent No.: US 9,297,079 B2
(45) Date of Patent: Mar. 29, 2016

(54) IRON ALLOY ARTICLE, IRON ALLOY MEMBER, AND METHOD FOR PRODUCING THE IRON ALLOY ARTICLE

(75) Inventors: Kinji Hirai, Gotenba (JP); Muneya Furukawa, Gotenba (JP); Isamu Akiyama, Gotenba (JP)

(73) Assignee: ADVANCED TECHNOLOGIES, INC., Gotenba-Shi (JP)

( * ) Notice: Subject to any disclaimer, the term of this patent is extended or adjusted under 35 U.S.C. 154(b) by 455 days.

(21) Appl. No.: 13/001,249

(22) PCT Filed: Jun. 23, 2009

(86) PCT No.: PCT/JP2009/061407
§ 371 (c)(1),
(2), (4) Date: Mar. 18, 2011

(87) PCT Pub. No.: WO2009/157445
PCT Pub. Date: Dec. 30, 2009

(65) Prior Publication Data
US 2011/0159302 A1      Jun. 30, 2011

(30) Foreign Application Priority Data
Jun. 24, 2008   (JP) .................................. 2008-164221

(51) Int. Cl.
| | | |
|---|---|---|
| *B32B 15/04* | (2006.01) | |
| *C23C 22/83* | (2006.01) | |
| *C09D 5/00* | (2006.01) | |
| *C23C 22/05* | (2006.01) | |
| *C23C 22/07* | (2006.01) | |

(52) U.S. Cl.
CPC ................ *C23C 22/83* (2013.01); *C09D 5/002* (2013.01); *C23C 22/05* (2013.01); *C23C 22/07* (2013.01); *C23C 2222/20* (2013.01)

(58) Field of Classification Search
None
See application file for complete search history.

(56) References Cited

U.S. PATENT DOCUMENTS 4,330,446 A  *  5/1982  Miyosawa .................... 523/409
6,096,139 A  *  8/2000  Shimakura et al. .......... 148/251
(Continued)

FOREIGN PATENT DOCUMENTS

EP          0 354 510 A2    2/1990
JP          61-076684 A     4/1986
(Continued)

OTHER PUBLICATIONS

Machine Translation of JP 2009-114504 A, May 2009.*
(Continued)

*Primary Examiner* — Callie Shosho
*Assistant Examiner* — Daniel D Lowrey
(74) *Attorney, Agent, or Firm* — Foley & Lardner LLP

(57) ABSTRACT

Disclosed is an iron alloy article having an excellent bonding force between a resin and an iron alloy using an alkoxysilane-containing triazinethiol, and a method for producing the iron alloy article. Also disclosed is an iron alloy article including a base comprised of iron or an iron alloy, and a resin bonded to at least a portion of a surface of the base through a dehydrated silanol-containing triazinethiol derivative coating, the iron alloy article further including a metal compound film containing at least one selected from the group consisting of a hydroxide, a carboxylate, a phosphate, a sulfate, a thiosulfate, a chloride and a perchloride between the base and the dehydrated silanol-containing triazinethiol derivative coating.

12 Claims, 2 Drawing Sheets

(56) References Cited

U.S. PATENT DOCUMENTS

| | | | |
|---|---|---|---|
| 6,241,830 B1 * | 6/2001 | Shimakura et al. | 148/251 |
| 6,309,477 B1 | 10/2001 | Shimakura et al. | |
| 6,835,460 B2 * | 12/2004 | Cuyler et al. | 428/469 |
| 7,348,068 B2 | 3/2008 | Matsuda et al. | |

FOREIGN PATENT DOCUMENTS

| | | | |
|---|---|---|---|
| JP | 02-099530 | | 4/1990 |
| JP | 10-270629 | | 10/1998 |
| JP | 2001-047462 | | 2/2001 |
| JP | 2001-200374 | | 7/2001 |
| JP | 2001-260235 | | 9/2001 |
| JP | 2005-344147 | | 12/2005 |
| JP | 2006-213677 | | 8/2006 |
| JP | 2006-274296 | | 10/2006 |
| JP | 2007-017921 | | 1/2007 |
| JP | 2007-131580 | | 5/2007 |
| JP | 2009114504 A | * | 5/2009 |

OTHER PUBLICATIONS

International Preliminary Report on Patentability (IPRP) in PCT/JP2009/061407 dated Feb. 17, 2011.

The Surface Finishing Society of Japan, "Surface Technology Handbook", The Nikkan Kokyo Shinbun, Ltd., Feb. 27, 1998, First edition, p. 661.

International Search Report in PCT/JP2009/061407 dated Jul. 21, 2009.

Mamiya, Fujio, "Actual Chemical Treatment," Chijinshokan Co., Ltd., p. 161-164, First Edition, Oct. 10, 1993.

Sakai et al., "Corrosion Preventitive Effect of Ultraphosphate on Iron," Journal of the Japan Society of Colour Material, vol. 40, 1967, p. 205-210.

* cited by examiner

Prior Art

IRON ALLOY ARTICLE, IRON ALLOY MEMBER, AND METHOD FOR PRODUCING THE IRON ALLOY ARTICLE

TECHNICAL FIELD

The present invention relates to an iron alloy article including iron and steel (including stainless steel) in which a resin is bonded to at least a portion of a surface, and an iron alloy member subjected to a surface treatment so as to coat at least a portion of a surface with a resin, as well as a method for producing the iron alloy article and the iron alloy member; and particularly to an iron alloy article and an iron alloy member, which are excellent in tight bonding between a resin and an iron alloy base, and a method for producing the iron alloy article and the iron alloy member.

BACKGROUND ART

Iron and an iron alloy (the iron alloy in the present description is the concept including steel as a matter of course and the steel also includes stainless steel) have high strength and rigidity and are widely used as industrial materials. An iron alloy article in which a resin is bonded to at least a portion of a surface of an iron alloy base ensures excellent rigidity, which cannot be obtained by a resin molded article alone, using the iron alloy base, and also enables a complicated shape and aesthetics, which cannot be achieved by an iron alloy alone, using the resin. Therefore, the iron alloy article is used in various fields including above applications.

There has hitherto been used a method in which an iron alloy base is provided with notches or perforations in advance and, in the case of performing in-mold molding of the iron alloy base by injection molding using a resin, the resin enters into these portions thereby fixing the resin to the iron alloy base.

However, this method has a problem that it is necessary to ensure the place where notches or perforations are provided, resulting in large restriction on design, and a problem that a bonding force is not exerted between a resin and a base except for the notch or perforation portion and thus a gap may be formed between the base and the resin. Therefore, according to this method, since the iron alloy base and the resin are not completely integrated, the resin portion, which is likely to be deformed when deforming stress is applied, easily undergoes deformation, thus making it impossible to use of rigidity of the iron alloy base. Therefore, it is sometimes impossible to ensure rigidity, which cannot be obtained by the resin molded article alone, using the iron alloy base.

Thus, there has been proposed, as a method which does not require notches or perforations and can exerting a bonding force over the entire bonding surface between a resin and a base, a method of bonding a rubber and a metal, characterized by bringing an acidic surface treatment agent into contact with a surface of a metallic material to form a coating layer on the surface of the metallic material, peeling a portion or all of the coating layer, coating a resin composition containing a silane coupling agent thereon, drying the resin composition and coating an aqueous adhesive primer for rubber/metal and an aqueous adhesive for rubber/metal thereon, followed by drying and further vulcanization bonding of a rubber material (Patent Document 1).

Furthermore, there have been proposed a method characterized by roughening a surface of an iron alloy material of a lead frame material through dull roll rolling or etching to form a roughened surface having fine unevenness so as to improve tight adhesion between a lead frame for semiconductor package and a sealing material, adjusting the arithmetic mean roughness within a range from 0.05 to 0.8 µm and also adjusting the surface area substitution value within a range from 1.005 to 1.08, and molding the sealing material composed of a thermosetting resin such as an epoxy resin thereon (Patent Document 2), and a method characterized by subjecting a surface of metal components to a surface treatment with triazinethiols in advance, or performing microetching using an etching solution such as an aqueous permanganic acid solution having strong oxidizability so as to adjust surface roughness Ra within a range from 1 to 10 µm, or forming an oxide layer on a surface using an oxidizing agent, in order to increase an adhesive strength in the case of in-mold molding of a metal terminal of a connector and a holding portion made of a resin, and molding an integrating a nylon resin containing a polyfunctional monomer, followed by crosslinking and a heat treatment at 100° C. or higher of the nylon resin through irradiation with radiation (Patent Document 3).

Patent Document 1; JP 2001-260235A
Patent Document 2; JP H10-270629A
Patent Document 3; JP 2001-047462A

DISCLOSURE OF THE INVENTION

Problems to be Solved by the Invention

However, the above methods had a problem that steps are too complicated and applicable resins are limited to a rubber, a thermosetting resin and a nylon resin.

In particular, when a method of introducing a reactive functional group into a metal surface using triazinethiol is used for bonding of an iron alloy and a resin, there was a problem that the obtained bonding strength is lower than that in the case of bonding metal such as a copper alloy, and a resin.

Thus, an object of the present invention is to provide an iron alloy article having an excellent bonding force between a resin and an iron alloy using an alkoxysilane-containing triazinethiol, and a method for producing the iron alloy article. Another object of the present invention is to provide an iron alloy member for bonding a resin to a surface, and a method for producing the iron alloy article.

Means for Solving the Problems

The present invention is directed to an iron alloy article comprising a base composed of iron or an iron alloy, and a resin bonded to at least a portion of a surface of the base through a dehydrated silanol-containing triazinethiol derivative coating, the iron alloy article further comprising a metal compound film containing at least one selected from the group consisting of a hydroxide, a carboxylate, a phosphate, a sulfate, a thiosulfate, a chloride and a perchloride between the base and the dehydrated silanol-containing triazinethiol derivative coating.

The present invention is also directed to a method for producing an iron alloy article in which a resin is bonded to at least a portion of an iron alloy base composed of iron or an iron alloy using an alkoxysilane-containing triazinethiol derivative, the method comprising the steps of forming a metal compound film on at least a portion of a surface of the iron alloy base using a solution containing at least one selected from the group consisting of carboxylic acid, a carboxylate, phosphoric acid, a phosphate, sulfuric acid, a sulfate, a thiosulfate, hydrochloric acid, a chloride, perchloric acid and a perchlorate; bringing an alkoxysilane-containing triazinethiol derivative into contact with the metal compound film; and bonding a resin to the portion contacted with the alkoxysilane-containing triazinethiol derivative.

The present invention is further directed to an iron alloy member comprising a base composed of iron or an iron alloy, and a dehydrated silanol-containing triazinethiol derivative or a silanol-containing triazinethiol derivative with which at least a portion of a surface of the base is coated, the iron alloy member further comprising a metal compound film containing at least one selected from the group consisting of a hydroxide, a carboxylate, a phosphate, a sulfate, a thiosulfate, a chloride and a perchlorate between the base and the dehydrated silanol-containing triazinethiol derivative coating or the silanol-containing triazinethiol derivative coating.

The present invention is still further directed to a method for producing an iron alloy member in which an alkoxysilane-containing triazinethiol derivative is brought into contact with at least a portion of an iron alloy base composed of iron or an iron alloy, the method comprising the steps of forming a metal compound film on at least a portion of a surface of the iron alloy base using a solution containing at least one selected from the group consisting of carboxylic acid, a carboxylate, phosphoric acid, a phosphate, sulfuric acid, a sulfate, a thiosulfate, hydrochloric acid, a chloride, perchloric acid and a perchlorate; and bringing an alkoxysilane-containing triazinethiol derivative into contact with the metal compound film.

Effects of the Invention

According to the present invention, by introducing a metal compound film into a surface of an iron alloy base, and introducing a reactive functional group into a surface of a metal compound film using an alkoxysilane-containing triazinethiol derivative (for example, an alkoxysilane-containing triazinethiol metal salt), it becomes possible to provide an iron alloy member which is capable of bonding a resin to a surface thereof with a high bonding force, an iron alloy article having a high bonding strength between an iron alloy base and a resin, and a method for producing the iron alloy member and the iron alloy article.

DESCRIPTION OF REFERENCE NUMERALS

1: Iron alloy base
2: Metal compound film
3: Dehydrated silanol-containing triazinethiol derivative coating
4: Resin

BEST MODE FOR CARRYING OUT THE INVENTION

The inventors of the present invention have studied about the reason why sufficiently high bonding force cannot be obtained even when an alkoxysilane-containing triazinethiol derivative is used to bond an iron alloy base and a resin together, and found that this may be sometimes caused by an oxide film of a surface of an iron alloy base.

When metal and a resin are bonded using an alkoxysilane-containing triazinethiol derivative, an alkoxysilane moiety is chemically bonded with the metal, thereby introducing a reactive functional group composed of triazinethiol derivative moiety into a surface of the metal. By chemically bonding the functional group (a triazinethiol derivative moiety) and the resin, it is possible to chemically bonding the metal and the resin via a dehydrated silanol-containing triazinethiol derivative (a product produced from the alkoxysilane-containing triazinethiol derivative as a result of chemically bonding of the above alkoxysilane moiety and the metal), thus making it possible to obtain a strong bonding force.

Usually, bonding of an alkoxysilane group of an alkoxysilane-containing triazinethiol derivative and metal is performed by preparing a solution of the alkoxysilane-containing triazinethiol derivative and dipping the metal in the solution, thus causing a reaction of a hydroxyl group (OH group) of a surface of the metal and the alkoxysilane group. Therefore, a method of removing an oxide layer of a surface of metal and introducing a hydroxyl group (OH group) into the surface of the metal by a plasma treatment is commonly used.

However, since iron has a strong bonding force with oxygen and an oxide layer formed on a surface of an iron alloy is dense and also firm, it is possible to estimate that an OH group is not sufficiently introduced and a sufficient bonding number (density) cannot be obtained between an iron alloy and an alkoxysilane group. Also, since just removing a coating film of iron oxide results in immediate forming of a new oxide layer by bonding iron and oxygen, a high bonding force cannot be obtained.

Thus, the present inventors has reached an invention described in the present application in which a metal compound film containing at least one among a hydroxide, a carboxylate, a phosphate, a sulfate, a thiosulfate, a chloride and a perchloride, which is capable of reacting with an alkoxysilane group to form a bond therewith, is formed on a surface of metal by subjecting an iron alloy base to a surface treatment, and then the iron alloy base is strongly bonded to a resin to be disposed on a surface thereof using an alkoxysilane-containing triazinethiol.

The present invention will be described in detail below.

Figure 1:
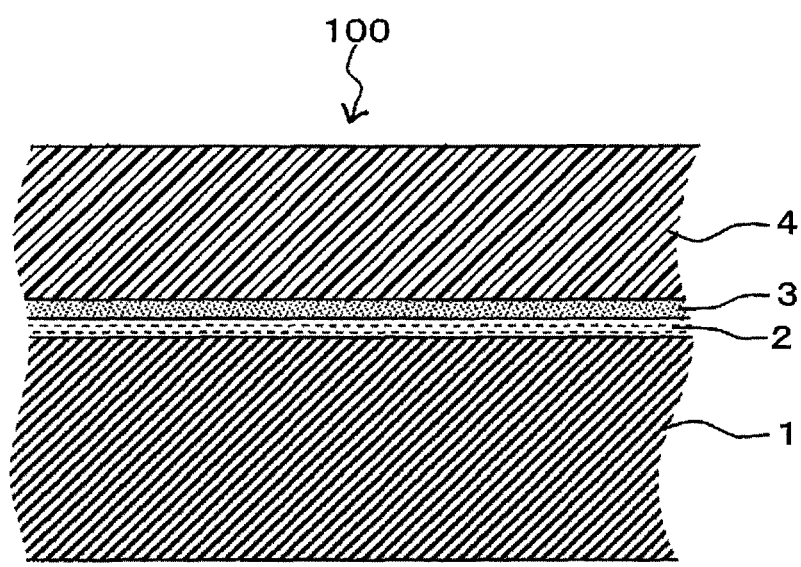
FIG. 1 a sectional view of an iron alloy article according to the present invention.

FIG. 1 is a sectional view schematically showing a portion of an iron alloy article according to the present invention, the entire of which is denoted by the reference numeral 100. An iron alloy base 1 composed of iron or an iron alloy and a resin layer 4 are bonded via a metal compound film 2 and a dehydrated silanol-containing triazinethiol derivative coating 3 which are described in detail hereinafter.

Figure 2:
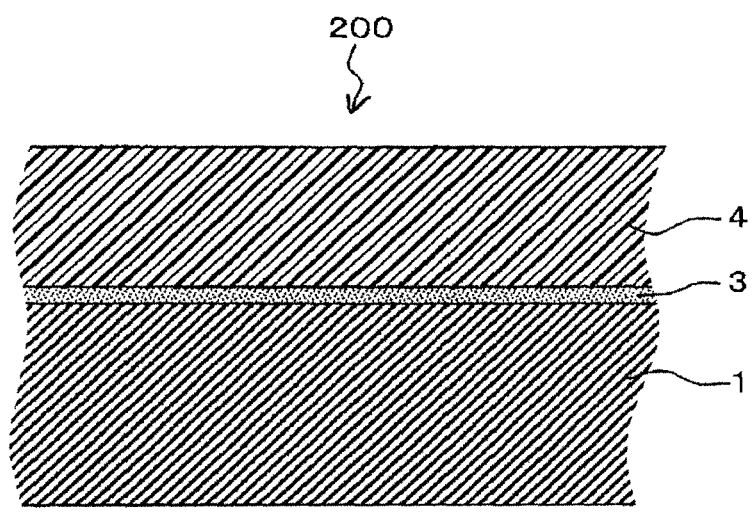
FIG. 2 is a sectional view of a conventional iron alloy article.

A section of a conventional iron alloy article 200 in which an iron alloy base 1 and a resin layer 4 are bonded using a dehydrated silanol-containing triazinethiol derivative 3 is shown in FIG. 2. The conventional iron alloy article 200 does not include a metal compound film 2.

The metal compound film 2, which is a feature of the iron alloy article 100 according to the present invention, is formed from at least one selected from the group consisting of a hydroxide, a carboxylate, a phosphate, a sulfate, a thiosulfate, a chloride and a perchloride.

A method for producing an iron alloy article 100 of the present invention in which an iron alloy base 1 and a resin 4 are strongly bonded using this metal compound film 2 will be described in detail below.

1. Pretreatment

It is preferred that a degreasing treatment is performed as a pretreatment before performing a treatment (metal compound treatment) of forming a metal compound film, details of which are described hereinafter.

The degreasing treatment may be performed by a method which is usually used for degreasing an iron alloy base molded article and, for example, degreasing is performed using a strong alkali such as sodium hydroxide. Degreasing under preferred conditions is, for example, degreasing performed in sodium hydroxide having a concentration of 10 to 100 g/L at a temperature of 50° C. to 90° C. Degreasing under more preferred conditions is performed by preliminary degreasing in sodium hydroxide having a concentration 10 to 100 g/L (most preferably 10 to 20 g/L) at a temperature of 50° C. to 90° C. and subsequent degreasing in sodium hydroxide having a concentration of 10 to 100 g/L (most preferably 60 to 90 g/L) at a temperature of 50° C. to 90° C.

Degreasing may be performed using, in addition to the above strong alkali, sodium salts such as sodium carbonate, sodium bicarbonate and borax; silicates such as sodium orthosilicate and sodium silicate; various sodium phosphates such as monobasic sodium phosphate, dibasic sodium phosphate and tribasic sodium phosphate; and phosphates such as sodium pyrophosphate and sodium hexametaphosphate.

The iron alloy base 1 is composed of iron or an iron alloy, and any industrially usable iron alloy can be used. Examples of preferred iron alloy include carbon steel, alloy steel, nickel-chromium steel (nickel-chromium stainless steel), nickel-chromium-molybdenum steel, chromium steel, chromium-molybdenum steel and manganese steel.

The shape may be any shape including a plate-like (sheet-like) shape of a rolled sheet, a tubular shape of a pipe, and a cylindrical shape of a wire.

2. Metal Compound Treatment

After the degreasing treatment (pretreatment), a metal compound film 2 (also referred to as a "compound film") containing at least one of a hydroxide, a carboxylate, a phosphate, a sulfate, a thiosulfate, a chloride and a perchloride is formed on a surface of the iron alloy base 1 by a metal compound treatment (also referred to as a "compound treatment") described below.

The metal compound treatment is carried out using at least one of an acid or a compound described below.

"Metal" of the "metal compound coating film" described in the present description means at least one kind among metal contained in the iron alloy base 1 and metal contained in a solution (metal compound treatment solution) used in the metal compound treatment, details of which are described hereinafter.

(1) Carboxylic Acid, Carboxylate

Using an aqueous solution of carboxylic acid such as tannic acid, the iron alloy base 1 is subjected to the metal compound treatment. Thereby, a metal compound film containing, as a main component, an iron salt and/or a metal salt of carboxylic acid, and/or a hydroxide is formed on a surface of the iron alloy base 1.

Also, the metal compound treatment may be performed using an aqueous solution of an alkali metal salt such as a sodium salt or a potassium salt of carboxylic acid such as lauric acid, palmitic acid or stearic acid. In this case, a metal compound film 2 containing mainly an alkali metal salt of these carboxylic acids and a hydroxide is formed on the surface of the iron alloy base 1. The metal compound film 2 sometimes contains an iron salt and/or a metal salt of the above carboxylic acid.

Using an aqueous solution of a metal salt of formic acid, acetic acid, oxalic acid or succinic acid, the metal compound treatment may be performed. In this case, a metal compound film 2 containing mainly a metal salt of these carboxylic acids and/or a hydroxide is formed on the surface of the iron alloy base 1. The metal compound film 2 sometimes contains an iron salt of the above carboxylic acid. For example, when the metal compound treatment is performed using an aqueous solution of an oxalic acid metal salt, the aqueous solution is preferably an aqueous solution having a concentration of 0.5 to 100 g/L at a temperature of 30 to 70° C.

(2) Phosphoric Acid, Phosphate

Using a solution of a phosphoric acid or a phosphate containing —$H_2PO_4$, —$HPO_4$ or —$PO_4$, for example, a phosphoric acid; a metal hydrogen phosphate such as zinc hydrogen phosphate, manganese hydrogen phosphate or calcium hydrogen phosphate; a metal dihydrogen phosphate such as calcium dihydrogen phosphate; or a metal phosphate such as zinc phosphate, manganese phosphate, calcium phosphate, calcium sodium phosphate or zirconium phosphate, a metal compound treatment is performed. The phosphoric acid in the present description is phosphoric acid in a broad sense including orthophosphoric acid, metaphosphoric acid, pyrophosphoric acid, triphosphoric acid and tetraphosphoric acid, while the phosphate is the concept including compounds of phosphoric acids in a broad sense such as orthophosphoric acid, metaphosphoric acid, pyrophosphoric acid, triphosphoric acid and tetraphosphoric acid.

Using phosphoric acid, a metal compound film 2 containing, as main component(s), iron phosphate and/or a metal phosphate and/or a hydroxide is formed on a surface of an iron alloy base 1.

Using an aqueous solution of a phosphate (a metal salt of phosphoric acid) such as zinc phosphate, zinc hydrogen phosphate, manganese phosphate, manganese hydrogen phosphate, metal hydrogen phosphate, metal dihydrogen phosphate, metal phosphate, calcium hydrogen phosphate, calcium dihydrogen phosphate, calcium phosphate, calcium sodium phosphate or zirconium phosphate, a metal compound treatment is conducted, thereby making it possible to form a metal compound film 2 containing, as main components, these phosphates and/or hydroxides on a surface of an iron alloy base 1. The metal compound film 2 of these phosphates and/or hydroxides may also contain an iron phosphate and/or a metal phosphate. It may also contain plural phosphates other than the iron phosphate and metal phosphate by performing the metal compound treatment in a solution containing a mixture of phosphates of different kinds of metals.

For example, when the metal compound treatment is performed using an aqueous solution of zirconium phosphate, the aqueous solution is preferably an aqueous solution having a concentration of 1 to 100 g/L at a temperature of 20 to 90° C. In the case of using an aqueous solution of phosphoric acids and phosphates, such as other phosphoric acids, zinc phosphate, zinc hydrogen phosphate, manganese phosphate, manganese hydrogen phosphate, metal hydrogen phosphate, metal dihydrogen phosphate, metal phosphate, calcium hydrogen phosphate, calcium dihydrogen phosphate, calcium phosphate and calcium sodium phosphate, the aqueous solution is preferably an aqueous solution having a concentration of 5 to 30 g/L at a temperature of 20 to 90° C., and more preferably a temperature of 25° C. to 75° C.

(3) Sulfuric Acid, Sulfate

Using sulfuric acid or an aqueous solution of a metal salt of sulfuric acid, such as sodium sulfate, manganese sulfate, calcium sulfate, titanyl sulfate, zirconium sulfate, potassium sulfate or sodium sulfate, a metal compound treatment is performed. In the case of using sulfuric acid, a metal compound film 2 containing, as a main component, iron sulfate, metal sulfate or a hydroxide, or a mixture thereof is formed on a surface of an iron alloy base 1. In the case of using an aqueous solution of a metal salt of sulfuric acid, such as sodium sulfate, manganese sulfate, calcium sulfate, titanyl sulfate, zirconium sulfate, potassium sulfate or sodium sulfate, a metal compound film 2 containing, as main components, these metal salts and/or a hydroxide is formed. The obtained metal compound film 2 may contain iron sulfate and/or a metal sulfate.

For example, when a metal compound treatment is performed using an aqueous solution of a metal salt such as potassium sulfate, the aqueous solution is preferably an aqueous solution having a concentration of 0.5 to 30 g/L at a temperature of 30 to 60° C.

(4) Thiosulfate

Using an aqueous solution of a thiosulfate such as sodium thiosulfate or calcium thiosulfate, a metal compound treatment is performed. A metal compound film 2 containing, as main components, these thiosulfates and/or a hydroxide is formed on a surface of an iron base 1. The obtained metal compound film 2 may contain iron thiosulfate and/or a metal thiosulfate.

For example, when the metal compound treatment is performed using an aqueous solution of calcium thiosulfate, the aqueous solution is preferably an aqueous solution having a concentration of 20 to 50 g/L at a temperature of 40 to 60° C.

(5) Hydrochloric Acid, Chloride

Using hydrochloric acid or an aqueous solution of a metal salt of hydrochloric acid, such as sodium chloride, potassium chloride, calcium chloride, magnesium chloride, iron chloride or aluminum chloride, a metal compound treatment is performed. In the case of using hydrochloric acid, a metal compound film 2 containing, as a main component, iron chloride, metal chloride or a hydroxide, or a mixture thereof is formed on a surface of an iron alloy base 1. In the case of using an aqueous solution of a metal salt, such as sodium chloride, potassium chloride, calcium chloride, magnesium chloride, iron chloride or aluminum chloride, a metal compound film 2 containing, as a main component, these metal salts and/or a hydroxide is formed. The obtained metal compound film 2 may contain iron chloride and/or a metal chloride.

For example, when the metal compound treatment is performed using an aqueous solution of a metal salt such as potassium chloride, the aqueous solution is preferably an aqueous solution having a concentration of 5 to 100 g/L at a temperature of 50 to 90° C.

(6) Perchloric Acid, Perchlorate

Using perchloric acid, or an aqueous solution of a metal salt of perchloric acid, such as sodium perchlorate, potassium perchlorate, calcium perchlorate, ammonium perchlorate, iron perchlorate, copper perchlorate or nickel perchlorate, a metal compound treatment is performed. In the case of using perchloric acid, a metal compound film 2 containing, as a main component, iron chloride, a metal chloride or a hydroxide, or a mixture thereof is formed on a surface of an iron alloy base 1. In the case of using an aqueous solution of a metal salt of perchloric acid, such as sodium perchlorate, potassium perchlorate, calcium perchlorate, ammonium perchlorate, iron perchlorate, copper perchlorate or nickel perchlorate, a metal compound film 2 containing, as main components, these metal salts and/or a hydroxide is formed. The obtained metal compound film 2 may contain iron chloride and/or a metal chloride.

For example, when the metal compound treatment is performed using iron perchlorate, the aqueous solution is preferably an aqueous solution having a concentration of 1 to 50 g/L at a temperature of 30 to 60° C.

Among the metal compound treatments described above, a method using a sulfuric acid compound (or sulfuric acid) or a thiosulfuric acid compound is preferred, and a method using a sulfuric acid compound (or sulfuric acid) is more preferred.

In the method using phosphoric acid or a phosphate, it is possible to form a comparatively uniform metal compound film 2 which preferably has a thickness of 0.05 to 5 μm, and more preferably 0.05 to 2 μm.

Therefore, an alkoxysilane-containing triazinethiol derivative permeates into the metal compound film 2 to form a lot of sites capable of reacting with the metal compound film 2, and silanol produced by hydrolysis of alkoxysilane of a triazinethiol derivative and a phosphoric acid group and/or a hydroxyl group of a metal compound film component causes a dehydration reaction by a heat treatment, and thus they are chemically bonded. In such a manner, a stronger bond can be formed between the produced dehydrated silanol-containing triazinethiol derivative coating 3 and the metal compound film 2.

Furthermore, when a resin 4 undergoes shrinkage due to cooling after bonding, the comparatively thick metal compound film 2 has the effect of preventing peeling of the resin 4 and cracking of the metal compound film 2 by dispersing and absorbing stress generated between the resin 4 and the metal compound film 2. The concentration and the temperature of phosphoric acid or the solution of a phosphate are preferably within a range from 5 to 50 g/L, and a range from 30 to 60° C., respectively, as described above. When the concentration and the temperature are within the above ranges, it is possible to obtain a dense metal compound film 2 within comparatively short time.

The metal compound treatment using the above solution includes not only dipping of all or a portion of an iron alloy base 1 in a solution (metal compound treatment solution), but also coating of all or a portion of a surface of an iron alloy base 2 with a solution by spray or application, or coating contact with the solution.

Therefore, as is apparent from the above description, the metal compound film 2 is not necessarily formed on the entire surface of the iron alloy base 2 and may be appropriately formed at the required portion.

It is possible to combine the above metal compound treatments, as a matter of course.

Namely, the metal compound treatment may be performed using a solution prepared by mixing plural solutions (metal compound treatment solutions) used for the metal compound treatments described above. After the metal compound treatment was performed using one kind of solutions (metal compound treatment solutions) used for the metal compound treatments described above, a metal compound treatment may be further performed using another kind of a metal compound treatment solution.

The metal compound coating film 2 obtained by the above metal compound treatment is often roughened. Namely, surface roughness of a metal compound coating 2 is sometimes larger than that of the iron alloy base 1 before the metal compound treatment.

For example, it is possible to form a metal compound film 2 having an arithmetic mean roughness Ra of 0.10 μm or more by subjecting a surface of an iron alloy base 1 having an arithmetic mean roughness Ra of 0.09 μm or less specified in Japanese Industrial Standard (JIS B0601; 2001) to the above metal compound treatment.

Surface roughening of the metal compound coating film 2 can increase a contact area between a dehydrated silanol-containing triazinethiol derivative coating 3 formed on the metal compound coating film 2, and the metal compound film 2 and therefore contributes to an improvement in a bonding strength.

3. Coating of Alkoxysilane-Containing Triazinethiol Derivative

After forming a metal compound film 2 on a surface of an iron alloy base 1 by the above method, the metal compound film 2 is coated with an alkoxysilane-containing triazinethiol derivative.

The alkoxysilane-containing triazinethiol derivative to be used may be a known one, for example, an alkoxysilane-containing triazinethiol metal salt.

The alkoxysilane-containing triazinethiol derivative is represented by the general formulas shown in the following (formula 1) or (formula 2).

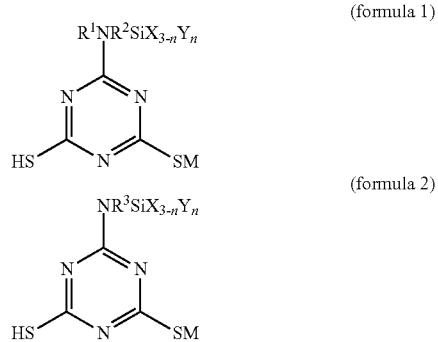

(formula 1)

(formula 2)

$R^1$ in the formula is, for example, any one of H—, $CH_3$—, $C_2H_5$—, $CH_2=CHCH_2$—, $C_4H_9$—, $C_6H_5$— and $C_6H_{13}$—. $R^2$ is, for example, any one of —$CH_2CH_2$—, —$CH_2CH_2CH_2$—, —$CH_2CH_2CH_2CH_2CH_2CH_2$—, —$CH_2CH_2SCH_2CH_2$— and —$CH_2CH_2NHCH_2CH_2CH_2$—. $R^3$ is, for example, —$(CH_2CH_2)_2$CHOCONHCH$_2$CH$_2$CH$_2$— or —$(CH_2CH_2)_2$N—CH$_2$CH$_2$CH$_2$—. In this case, N and $R^3$ form a cyclic structure.

X in the formula is any one of $CH_3$—, $C_2H_5$—, n-$C_3H_7O$—, i-$C_3H_7O$—, n-$C_4H_9O$—, i-$C_4H_9O$— and t-$C_4H_9$ Y is an alkoxy group such as $CH_3O$—, $C_2H_5O$—, n-$C_3H_7O$—, i-$C_3H_7O$—, n-$C_4H_9O$— or t-$C_4H_9O$—. n in the formula is any one numeral of 1, 2 and 3. M is an alkali metal, and preferably Li Na, K or Ce.

After coating the metal compound film 2, a solution of an alkoxysilane-containing triazinethiol derivative is prepared. A solvent to be used may dissolve the alkoxysilane-containing triazinedithiol derivative, and examples of the solvent include water and an alcohol-based solvent. For example, it is possible to use water, methanol, ethanol, propanol, carbitol, ethylene glycol and polyethylene glycol, and a mixed solvent thereof also may be used. The concentration of the alkoxysilane-containing triazinedithiol derivative is preferably from 0.001 g to 20 g/L, and more preferably from 0.01 g to 10 g/L.

The iron alloy base 1 including the metal compound film 2 is dipped in the obtained alkoxysilane-containing triazinedithiol derivative solution. The temperature of the solution is preferably within a range from 0° C. to 100° C., and more preferably from 20° C. to 80° C. The dipping time is preferably from 1 minute to 200 minutes, and more preferably from 3 minutes to 120 minutes.

As a result of dipping, an alkoxysilane moiety of the alkoxysilane-containing triazinethiol derivative is converted into silanol, and undergoes dehydration bonding with at least one of a hydroxide, a carboxylate, a phosphate, a sulfate, a thiosulfate, a chloride and a perchloride contained in the metal compound film 2 described above by a heat treatment. Therefore, the alkoxysilane-containing triazinethiol derivative after dipping is converted into a silanol-containing triazinethiol derivative to form a weak bond, like a hydrogen bond, with the metal compound film 2, and thus a chemical bonding force can be obtained.

Thereby, it is possible to obtain an iron alloy member composed of an iron alloy base 1, a metal compound film 2 and a silanol-containing triazinethiol derivative coating, which is used to bond a resin on the surface.

Then, the iron alloy member is heated to a temperature of 100° C. to 450° C. for the purpose of drying and a heat treatment for acceleration of a dehydration reaction. Since heating allows a silanol moiety of a silanol-containing triazinethiol derivative to undergo the dehydration bonding reaction, the silanol-containing triazinethiol derivative is converted into a dehydrated silanol-containing triazinethiol derivative to form a chemical bond with the metal compound film 2.

Thereby, it is possible to obtain an iron alloy member composed of an iron alloy base 1, a metal compound film 2 and a dehydrated silanol-containing triazinethiol derivative coating 3, which is used to bond a resin on the surface.

Then, in order to further increase a bonding force between the dehydrated silanol-containing triazinethiol derivative and the resin, the dehydrated silanol-containing triazinethiol derivative formed on the metal compound film 2 is optionally dipped in a solution containing appropriately a compound having bondability by a radical reaction, for example, dimaleimides such as N,N'-m-phenylenedimaleimide and N,N'-hexamethylenedimaleimide, as a bond auxiliary agent, and a peroxide such as dicumyl peroxide or benzoyl peroxide, or the other radical initiator. After dipping, the iron alloy member is dried and heat-treated at 30° C. to 270° C. for 1 minute to 600 minutes.

Thereby, the dehydrated silanol-containing triazinethiol derivative is converted into a dehydrated silanol-containing triazinethiol derivative in which metal ions of a triazinethiol metal salt (triazinethiol derivative) moiety are removed and sulfur is converted into a mercapto group, and the mercapto group reacts with one of two double bond moieties of maleic acid of N,N'-m-phenylenedimaleimide to bond N,N'-m-phenylenedimaleimide.

The radical initiator has the action of forming a radical by decomposition due to heat such as heating to be performed in the case of molding a resin and opening another bond of two double bond moieties due to the above maleic acid thereby reacting and bonding with the resin.

Furthermore, a solution prepared by appropriately dissolving a radical initiator such as a peroxide or a redox catalyst in an organic solvent such as benzene or ethanol is adhered onto a surface of an iron alloy member by dipping in the solution or spraying the solution using a spray, followed by air drying.

The radical initiator has the action of forming a radical by decomposition due to heat such as heating to be performed in the case of molding a resin and opening another bond of two double bond moieties due to the above maleic acid, or reacting with a metal salt moiety of a triazinethiol derivative thereby reacting and bonding with the resin.

4. Bonding with Resin

An iron alloy member including a metal compound film 2 and a dehydrated silanol-containing triazinethiol derivative layer 3, and resin 4 are bonded (compositely integrated) on a surface of iron metal base 1 to obtain an iron article 100. A resin 4 is disposed so as to be contacted with a dehydrated silanol-containing triazinethiol derivative layer 3 in a heated state. Thereby, the resin 4 reacts with a triazinethiol derivative moiety (a triazinethiol derivative bonded with a triazinethiol metal salt moiety or bismaleimides) of the dehydrated silanol-containing triazinethiol derivative 3 via a radical of a radical initiator to form a chemical bond.

The resin may be disposed only at a portion of the dehydrated silanol-containing triazinethiol derivative coating 3.

It is possible to use, as a method of disposing a heated resin 4 on a dehydrated silanol-containing triazinethiol derivative coating 3, for example, an injection molding method characterized by disposing an iron alloy member (including a metal base 1, a metal compound film 2 and a dehydrated silanol-containing triazinethiol derivative coating 3) in a mold, decomposing a radical initiator by heat of the mold and the resin during injecting the molted resin in the mold to obtain an insert molded article or an outsert molded article, and chemically bonding a triazinethiol derivative coating and the resin through a radical reaction thereby bonding the iron alloy member and the resin 4, or a fusion method characterized by heating an injection molded article on an oven or a hot plate after resin molding thereby decomposing a radical initiator, and performing chemically boding through a radical reaction thereby bonding the iron alloy member and the resin.

In the case of the injection molding, the mold temperature is maintained at 20 to 220° C. for 5 seconds to 10 minutes. In the case of the fusion method, the oven or hot plate temperature is maintained at 30 to 430° C. for 1 minute to 10 hours. It is necessary that the temperature is equal to or higher than a decomposition temperature of a radical initiator, while the retention time is enough time for a radical to form chemical bonding between a triazinethiol derivative and a resin.

The method of bonding the iron alloy member and the resin is not limited to the above injection molding method and fusion method in which the injection molded article is heated, and it is possible to use an optional technique of bonding an iron alloy and a resin, which is industrially used. Preferred examples of the bonding method include hot plate fusion. The hot plate fusion is a method in which a resin is melted by bringing into contact with a heat source such as a plate at a high temperature, and an iron alloy member is bonded by pressed against the molten resin before the resin is solidified by cooling.

Although any industrially usable resin can be used as the resin to be bonded, a resin having an element and a functional group capable of reacting with a radical is preferred. Examples of such preferred resin include a phenol resin, a hydroquinone resin, a cresol resin, a polyvinylphenol resin, a resorcin resin, a melamine resin, a glyptal resin, an epoxy resin, a modified epoxy resin, a polyvinyl formal resin, a polyhydroxymethyl methacrylate and a copolymer thereof, polyhydroxyethyl acrylate and a copolymer thereof, acryl resin, polyvinyl alcohol and a copolymer thereof, vinyl polyacetate, a polyethylene terephthalate resin, a polyimide resin, a polyetherimide resin, a polyketoneimide resin, a polybutylene terephthalate resin, an unsaturated polyester resin, a polyphenylene sulfide resin, a polyphenylene oxide resin, a polystyrene resin, an ABS resin, a polycarbonate resin (PC resin), a 6-nylon resin, a 66-nylon resin, a 610-nylon resin, an aromatic polyamide resin, a urea resin, a styrene-based elastomer resin, an olefin-based elastomer resin, a vinyl chloride-based elastomer resin, a urethane-based elastomer resin, an ester-based elastomer resin, an amide-based elastomer resin, and a composite resin obtained by combining two or more kinds selected from these resins, as well as a reinforced resin obtained by reinforcing these resins with a glass fiber, a carbon fiber, ceramics or the like.

According to the method described above, it becomes possible to produce an iron alloy article 100 in which an iron alloy base 1 and a resin 4 are bonded via a metal compound film 2 and a dehydrated silanol-containing triazinethiol derivative coating 3.

The iron alloy article obtained by the present method has, in addition to an advantage that a bonding strength between an iron alloy base and a resin is high, an advantage that it is not necessary to subject a surface of an iron article to machining, and also the resin can be bonded without using an adhesive or an elastomeric resin for stress relieving, thus enabling to reducing the numbers of working steps and to obtain satisfactory finish of the bonding portion with good dimensional accuracy.

Furthermore, there is an advantage that an article is finished with resin molding accuracy by coating a portion having poor molding accuracy of a hard-to-mold iron base with a resin, thus making it possible to increase the yield of a product.

EXAMPLES (1) Pretreatment

A SUS304 (18Cr-8Ni stainless steel specified in Japanese Industrial Standard, surface finish; No. 2B) sheet measuring 80 mm in length, 20 mm in width and 1.5 mm in thickness, and SPCC (cold rolled steel sheet specified in Japanese Industrial Standard, JIS G3141; 2005) measuring 80 mm in length, 20 mm in width and 1.2 mm in thickness were subjected to a pretreatment.

Regarding a pretreatment (degreasing treatment), all samples of Examples and Comparative Examples were subjected to preliminary degreasing in an aqueous sodium hydroxide solution having a concentration of 15.0 g/L at a temperature of 60° C., followed by degreasing in an aqueous sodium hydroxide solution having a concentration of 75.0 g/L at a temperature of 70° C. for 60 seconds, rinsing with water for 60 seconds and further drying in an oven at 80° C. for 30 minutes.

(2) Metal Compound Treatment

In order to obtain samples of Examples 1-1 to 1-3, A SUS304 sheet (iron alloy base) subjected to the degreasing treatment mentioned above was subjected to the following metal compound treatment.

In the sample of Example 1-1, a metal compound film containing, as main components, a hydroxide and a sulfate of iron, chromium, nickel and manganese was obtained on a surface of an iron alloy sheet by etching in an aqueous sulfuric acid solution (sulfuric acid accounts for 95% or more of the component other than water) having a concentration of 40 to 50 g/L at a temperature of 60° C. for 300 seconds, followed by rinsing with hot water (60° C.), rinsing with water for each 60 seconds, and further dipping in a sodium hydroxide solution having a concentration of 60 g/L at a temperature of 70° C. for 180 seconds.

In the sample of Example 1-2, the time of etching with strong acid (sulfuric acid) of Example 1-1 was changed to 600 seconds.

In the sample of Example 1-3, a metal compound film containing manganese phosphate as a main component and also containing a hydroxide of iron, chromium, nickel and manganese was obtained on a surface of a SUS304 sheet by dipping in an aqueous manganese phosphate solution having a concentration of 7.5 to 10.0 g/L at a temperature of 35° C. for 30 seconds.

Furthermore, in order to obtain the samples of Examples 2-1 to 2-24, a SUS304 sheet subjected to the above pretreatment was subjected to the following metal compound treatment. In order to obtain the samples of Examples 2-25 to 2-46, SPCC (cold rolled steel sheet) subjected to the above treatment was subjected to the following metal compound treatment.

Details of the samples of Comparative Examples 2-1 to 2-4 which are not subjected to a metal compound treatment are also described below.

The production conditions of the samples of Examples 2-1 to 2-46 and Comparative Examples 2-1 to 2-8 are shown in Table 1.

TABLE 1

| | Iron alloy base | Polishing or blasting | Surface roughness [Ra] | Metal salt compound treatment | Triazinethiol derivative coating | Resin | Molding method |
|---|---|---|---|---|---|---|---|
| Example 2-1 | SUS304 | None | 0.15 | Sulfuric acid | Yes | ABS | Injection |
| Example 2-2 | SUS304 | None | 0.16 | Sulfuric acid | Yes | PC/ABS | Injection |
| Example 2-3 | SUS304 | None | 0.23 | Sulfuric acid | Yes | 66 Nylon | Injection |
| Example 2-4 | SUS304 | None | 0.18 | Sulfuric acid | Yes | PTEE | Injection |
| Example 2-5 | SUS304 | None | 0.16 | Sulfuric acid | Yes | ABS | Fusion |
| Example 2-6 | SUS304 | None | 0.22 | Sulfuric acid | Yes | 66 Nylon | Fusion |
| Example 2-7 | SUS304 | None | 0.17 | Sulfuric acid | Yes | PPS | Fusion |
| Example 2-8 | SUS304 | None | 0.20 | Sulfuric acid | Yes | PTEE | Fusion |
| Example 2-9 | SUS304 | None | 0.32 | Sulfuric acid + oxalic acid | Yes | ABS | Injection |
| Example 2-10 | SUS304 | None | 0.38 | Sulfuric acid + oxalic acid | Yes | PC/ABS | Injection |
| Example 2-11 | SUS304 | None | 0.29 | Sulfuric acid + oxalic acid | Yes | 66 Nylon | Injection |
| Example 2-12 | SUS304 | None | 0.33 | Sulfuric acid + oxalic acid | Yes | PTEE | Injection |
| Example 2-13 | SUS304 | None | 0.17 | Sulfuric acid → Phosphoric acid | Yes | ABS | Injection |
| Example 2-14 | SUS304 | None | 0.18 | Sulfuric acid → Phosphoric acid | Yes | PC/ABS | Injection |
| Example 2-15 | SUS304 | None | 0.17 | Sulfuric acid → Phosphoric acid | Yes | 66 Nylon | Injection |
| Example 2-16 | SUS304 | None | 0.20 | Sulfuric acid → Phosphoric acid | Yes | PTEE | Injection |
| Example 2-17 | SUS304 | None | 0.18 | Sulfuric acid → Hydrochloric acid | Yes | ABS | Injection |
| Example 2-18 | SUS304 | None | 0.18 | Sulfuric acid → Hydrochloric acid | Yes | PC/ABS | Injection |
| Example 2-19 | SUS304 | None | 0.19 | Sulfuric acid → Hydrochloric acid | Yes | 66 Nylon | Injection |
| Example 2-20 | SUS304 | None | 0.18 | Sulfuric acid → Hydrochloric acid | Yes | PTEE | Injection |
| Example 2-21 | SUS304 | None | 0.16 | Sulfuric acid → Hydrochloric acid | Yes | ABS | Injection |
| Example 2-22 | SUS304 | None | 0.17 | Sulfuric acid → Hydrochloric acid | Yes | PC/ABS | Injection |
| Example 2-23 | SUS304 | None | 0.17 | Sulfuric acid → Hydrochloric acid | Yes | 66 Nylon | Injection |
| Example 2-24 | SUS304 | None | 0.16 | Sulfuric acid → Hydrochloric acid | Yes | PTEE | Injection |
| Example 2-25 | SPCC | None | 0.54 | Phosphoric acid | Yes | ABS | Injection |
| Example 2-26 | SPCC | None | 0.61 | Phosphoric acid | Yes | PC/ABS | Injection |
| Example 2-27 | SPCC | None | 0.58 | Phosphoric acid | Yes | 66 Nylon | Injection |
| Example 2-28 | SPCC | None | 0.60 | Phosphoric acid | Yes | PTEE | Injection |
| Example 2-29 | SPCC | None | 0.51 | Phosphoric acid | Yes | ABS | Fusion |
| Example 2-30 | SPCC | None | 0.55 | Phosphoric acid | Yes | PC/ABS | Fusion |
| Example 2-31 | SPCC | None | 0.54 | Phosphoric acid | Yes | 66 Nylon | Fusion |
| Example 2-32 | SPCC | None | 0.57 | Phosphoric acid | Yes | PPS | Fusion |
| Example 2-33 | SPCC | None | 0.54 | Phosphoric acid | Yes | PTEE | Fusion |
| Example 2-34 | SPCC | None | 0.58 | Hydrochloric acid | Yes | ABS | Injection |
| Example 2-35 | SPCC | None | 0.67 | Hydrochloric acid | Yes | 66 Nylon | Injection |
| Example 2-36 | SPCC | None | 0.61 | Hydrochloric acid | Yes | PTEE | Injection |
| Example 2-37 | SPCC | None | 0.86 | Sulfuric acid → Phosphoric acid | Yes | ABS | Injection |
| Example 2-38 | SPCC | None | 0.77 | Sulfuric acid → Phosphoric acid | Yes | PC/ABS | Injection |
| Example 2-39 | SPCC | None | 0.85 | Sulfuric acid → Phosphoric acid | Yes | 66 Nylon | Injection |
| Example 2-40 | SPCC | None | 0.78 | Sulfuric acid → Phosphoric acid | Yes | PTEE | Injection |
| Example 2-41 | SPCC | None | 2.07 | Nitric acid | Yes | ABS | Injection |
| Example 2-42 | SPCC | None | 2.22 | Nitric acid | Yes | 66 Nylon | Injection |
| Example 2-43 | SPCC | None | 2.30 | Nitric acid | Yes | PTEE | Injection |
| Example 2-44 | SPCC | None | 0.33 | Zinc phosphate fine particles | Yes | 66 Nylon | Injection |
| Example 2-45 | SPCC | None | 0.30 | Zinc phosphate fine particles | Yes | PTEE | Injection |

TABLE 1-continued

| | Iron alloy base | Polishing or blasting | Surface roughness [Ra] | Metal salt compound treatment | Triazinethiol derivative coating | Resin | Molding method |
|---|---|---|---|---|---|---|---|
| Example 2-46 | SPCC | None | 0.37 | Zinc phosphate fine particles | Yes | 66 Nylon | Fusion |
| Comparative Example 2-1 | SUS304 | None | 0.08 | None | None | ABS | Injection |
| Comparative Example 2-2 | SPCC | None | 0.34 | None | None | 66 Nylon | Injection |
| Comparative Example 2-3 | SPCC | #60 Polishing | 0.45 | None | None | 66 Nylon | Injection |
| Comparative Example 2-4 | SPCC | Blasting | 6.16 | None | None | 66 Nylon | Injection |
| Comparative Example 2-5 | SUS304 | None | 0.08 | None | None | PTEE | Epoxy bonding |
| Comparative Example 2-6 | SPCC | None | 0.40 | None | None | PTEE | Epoxy bonding |
| Comparative Example 2-7 | SUS304 | None | 0.09 | None (coated with silane coupling agent) | None | ABS | Injection |
| Comparative Example 2-8 | SPCC | None | 0.38 | None (coated with silane coupling agent) | None | 66 Nylon | Injection |

With respect to the samples of Examples 2-1 to 2-46, surface roughness Ra (arithmetic mean roughness Ra specified in JIS B0601; 2001) was measured after the metal compound treatment. With respect to the samples of Comparative Examples 2-1 to 2-8 which are not subjected to a metal compound treatment, surface roughness Ra was measured after the above degreasing treatment (pretreatment).

The surface roughness Ra was measured using a laser microscope VK-8710 manufactured by Keyence Corporation. For comparison, the surface roughness of an untreated sample (sample which is not subjected to a degreasing treatment) was also measured.

The measurement results of the surface roughness Ra are shown in Table 1. The surface roughness Ra of the untreated sample was 0.08 µm in the case of SUS304 and 0.34 µm in the case of SPCC (cold rolled steel sheet).

The samples of Examples 2-1 to 2-8 were etched in an aqueous sulfuric acid solution (sulfuric acid accounts for 95% or more of the component other than water) having a concentration of 40 to 50 g/L at a temperature of 60° C. for 300 seconds, followed by rinsing with hot water (60° C.) and ronsing with water for 60 seconds each. As a result of the treatment, a metal compound film containing, as main components, a hydroxide and a sulfate of iron, chromium, nickel and manganese was obtained on a surface of an iron alloy sheet of the samples of Examples 2-1 to 2-8. After the metal compound treatment Ra was from 0.15 to 0.23 µm and increased by 0.06 to 0.14 µm as compared with the untreated sample.

The samples of Examples 2-9 to 2-12 were etched at temperature 60° C. for 600 seconds using an aqueous mixed acid solution (sulfuric acid and oxalic acid account for 95% or more of the component other than water) prepared by adding oxalic acid having a concentration of 90 to 120 g/L to sulfuric acid having a concentration of 90 to 120 g/L, followed by rinding with water for 60 seconds, dipping in dilute nitric acid having a concentration of 20 g/L at room temperature for 600 seconds and further rinsing with water for 60 seconds. As a result of the treatment, a metal compound film containing, as main components, a hydroxide and a sulfate, an oxalate and a nitrate of iron, chromium, nickel and manganese was obtained on each surface of the samples of Examples 2-9 to 2-12. After the metal compound treatment, Ra was from 0.29 to 0.38 µm and increased by 0.21 to 0.30 µm as compared with the untreated sample.

The samples of Examples 2-13 to 2-16 were etched in an aqueous sulfuric acid solution (sulfuric acid accounts for 95% or more of the component other than water) having a concentration of 40 to 50 g/L at a temperature of 60° C. for 300 seconds, followed by rinsing with hot water (60° C.) and rinsing with water for 60 seconds each, dipping in an aqueous phosphoric acid solution (phosphoric acid accounts for 90% or more of the component other than water) having a concentration of 10 to 30 g/L at a temperature of 40° C. for 180 seconds and further rinsing with water for 60 seconds. As a result of the treatment, a metal compound film containing, as main components, a metal salt of phosphoric acid, and a hydroxide was obtained on each surface of the samples of Examples 2-13 to 2-16. After the metal compound treatment Ra was from 0.17 to 0.20 µm and increased by 0.09 to 0.12 µm as compared with the untreated sample.

The samples of Examples 2-17 to 2-20 were etched in an aqueous sulfuric acid solution (sulfuric acid accounts for 95% or more of the component other than water) having a concentration of 40 to 50 g/L at a temperature of 60° C. for 300 seconds, followed by rinsing with hot water (60° C.) and rinsing with water for 60 seconds each, dipping in an aqueous hydrochlorid acid solution (hydrochloride acid accounts for 95% or more of the component other than water) having a concentration of 90 to 120 g/L at a temperature of 60° C. for 300 seconds and further rinsing with water for 60 seconds. As a result of the treatment, a metal compound film containing, as main components, a hydroxide, a sulfate and a chloride of iron, chromium, nickel and manganese was obtained on each surface of the samples of Examples 2-17 to 2-20. After the metal compound treatment Ra was from 0.18 to 0.19 µm and increased by 0.10 to 0.11 µm as compared with the untreated sample.

The samples of Examples 2-21 to 2-24 were etched in an aqueous sulfuric acid solution (sulfuric acid accounts for 95% or more of the component other than water) having a concentration of 40 to 50 g/L at a temperature of 60° C. for 300 seconds, followed by rinsing with hot water (60° C.) and rinsing with water for 60 seconds each, dipping in an aqueous nitric acid solution (nitric acid accounts for 95% or more of the component other than water) having a concentration of 170 to 230 g/L at a temperature of 60° C. for 300 seconds and further rinsing with water for 60 seconds. As a result of the treatment, a metal compound film containing, as main components, a hydroxide, a sulfate and a nitrate of iron, chromium, nickel and manganese was obtained on each surface of the samples of Examples 2-21 to 2-24. After the metal compound treatment Ra was from 0.16 to 0.17 μm and increased by 0.08 to 0.09 μm as compared with the untreated sample.

The samples of Examples 2-25 to 2-33 were etched in an aqueous phosphoric acid solution (phosphoric acid accounts for 90% or more of the component other than water) having a concentration of 30 to 50 g/L at a temperature of 60° C. for 300 seconds, followed by rinsing with hot water (60° C.) and rinsing with water for 60 seconds each. As a result of the treatment, a metal compound film containing, as main components, a metal salt of phosphoric acid, and a hydroxide was obtained on each surface of the samples of Examples 2-25 to 2-33. After the metal compound treatment Ra was from 0.51 to 0.61 μm and increased by 0.17 to 0.27 μm as compared with the untreated sample.

The samples of Examples 2-34 to 2-36 were etched in an aqueous hydrochloric acid solution (hydrochloric acid accounts for 95% or more of the component other than water) having a concentration of 80 to 100 g/L at a temperature of 60° C. for 300 seconds, followed by rinsing with hot water (60° C.) and rinsing with water for 60 seconds each. As a result of the treatment, a metal compound film containing, as main components, a chloride and a hydroxide of iron and manganese was obtained on each surface of the samples of Examples 2-34 to 2-36. After the metal compound treatment Ra was from 0.58 to 0.67 μm and increased by 0.24 to 0.33 μm as compared with the untreated sample.

The samples of Examples 2-37 to 2-40 were etched in an aqueous sulfuric acid solution (sulfuric acid accounts for 95% or more of the component other than water) having a concentration of 40 to 50 g/L at a temperature of 60° C. for 300 seconds, followed by rinsing with hot water (60° C.) and rinsing with water for 60 seconds each, dipping in an aqueous phosphoric acid solution (phosphoric acid accounts for 90% or more of the component other than water) having a concentration of 10 to 30 g/L at a temperature of 40° C. for 180 seconds and further rinsing with water for 60 seconds. As a result of the treatment, a metal compound film containing, as main components, a metal salt of phosphoric acid, a hydroxide was obtained on each surface of the samples of Examples 2-37 to 2-40. After the metal compound treatment Ra was from 0.77 to 0.86 μm and increased by 0.34 to 0.52 μm as compared with the untreated sample.

The samples of Examples 2-41 to 2-43 were etched in an aqueous nitric acid solution (nitric acid accounts for 95% or more of the component other than water) having a concentration of 150 to 200 g/L at a temperature of 60° C. for 300 seconds, followed by rinsing with water for 60 second. As a result of the treatment, a metal compound film containing, as main components, a nitrate and a hydroxide of iron and manganese was obtained on each surface of the samples of Examples 2-41 to 2-43. After the metal compound treatment Ra was from 2.07 to 2.30 μm and increased by 1.73 to 1.96 μm as compared with the untreated sample.

The samples of Examples 2-44 to 2-46 were dipped in a colloidal solution of zinc phosphate fine particles, having a concentration of 0.5 to 0.75 g/L at a temperature 30° C. for 300 seconds, followed by rinsing with water for 60 seconds. As the result of the treatment, zinc phosphate fine particles were adhered onto each surface of the samples of Examples 2-44 to 2-46. The zinc phosphate fine particles are adhered onto each surface of the samples at intervals of a micron level between each other, and each surface of the samples is not completely covered with the zinc phosphate fine particles (i.e., metal compound film). After the metal compound treatment Ra was from 0.30 to 0.37 μm and was nearly the same as that of the untreated sample As Comparative Examples, a SUS304 sheet subjected to only the above degreasing treatment was used as Comparative Example 1-1, while an aminosilane-based silane coupling agent was adhered onto a surface of a SUS304 sheet subjected to the degreasing treatment used in Example 1-2 in place of being subjected to the metal compound treatment and the obtained sample was used as Comparative Example 1-2. The silane coupling agent was adhered by preparing an aqueous 1% solution of KBM-603 (N-2-(aminoethyl)-3-aminopropyltrimethoxysilane) manufactured by Shin-Etsu Chemical Co. Ltd., dipping a SUS304 sheet in the aqueous solution at room temperature for 60 seconds, followed by drying in an oven at 110° C. for 10 minutes.

Furthermore, using SUS304 sheets (Comparative Examples 2-1, 2-5 and 2-7) and SPCC sheets (Comparative Examples 2-2 to 2-4, 2-6 and 2-8), respectively, the samples of Comparative Examples 2-1 to 2-8 shown in Table 2 were produced. All samples of Comparative Examples 2-1 to 2-8 were subjected to the degreasing treatment (pretreatment) among the above pretreatments, but were not subjected to the metal compound treatment.

In Comparative Examples 2-1, 2-2, 2-5 and 2-6, only the degreasing treatment was carried out.

The sample of Comparative Example 2-3 was subjected, in addition to a degreasing treatment, to polishing with a #60 mesh paper before the degreasing treatment.

The sample of Comparative Example 2-4 was subjected, in addition to a degreasing treatment, to blasting so that surface roughness Ra becomes 6.0 μm or more before the degreasing treatment.

Furthermore, the samples of Comparative Examples 2-7 and 2-8 were produced by dipping the samples subjected to the degreasing treatment among the pretreatments in an aqueous 1% solution of an aminosilane-based silane coupling agent (KBM-603 (N-2-(aminoethyl)-3-aminopropyltrimethoxysilane), manufactured by Shin-Etsu Chemical Co. Ltd.) at room temperature for 60 seconds, followed by drying in an oven at 110° C. for 10 minutes. In the sample of Comparative Example 2-3Ra was 0.45 μm and increased by 0.11 μm as compared with the untreated sample. In the sample of Comparative Example 2-4Ra was 6.16 μm and increased by 5.82 μm as compared with the untreated sample. Ra of other samples of Comparative Examples was nearly the same as that of the untreated sample.

(3) Coating with Alkoxysilane-Containing Triazinethiol Derivative

Next, the samples of Examples 1-1 to 1-3Comparative Examples 1-1 and 1-2 and Examples 2-1 to 2-46 were dipped in an alkoxysilane-containing triazinethiol solution.

An alkoxysilane-containing triazinethiol derivative used was triethoxysilylpropylaminotriazinethiol monosodium and was dissolved in a solvent composed of ethanol and water in a volume ratio of 95(etanol):5(water) so that the concentration becomes 0.7 g/L to obtain a solution. The samples were dipped in the triethoxysilylpropylaminotriazinethiol monosodium solution at room temperature for 30 minutes.

Then, these samples were subjected to a heat treatment in an oven at 160° C. for 10 minutes thereby completing the reaction, followed by drying. The heat-treated samples were dipped in an acetone solution containing N,N'-m-phenylenedimaleimide (N,N'-1,3-phenylenedimaleimide) having a concentration of 1.0 g/L and dicumyl peroxide having a concentration of 2 g/L at room temperature for 10 minutes, followed by a heat treatment in an oven at 150° C. for 10 minutes. Then, an ethanol solution of dicumyl peroxide having a concentration 2 g/L was sprayed over the entire surface of the sample at room temperature, followed by air drying.

(4) Bonding with Resin

Next, the samples of Examples 1-1 to 1-3Comparative Examples 1-1 and Comparative Example 1-2 were disposed in a mold heated to 120° C., and an ABS resin (STYLAC(R)-ABS general-purpose 026) manufactured by Asahi Kasei Chemicals Corporation was injection-molded at 220° C. so that a portion of a surface is bonded with the resin to obtain an iron article sample.

The resin was molded in the mold so as to form into a sheet measuring 80 mm in length, 20 mm in width and 3 mm in thickness, and a portion measuring 12 mm in length and 20 mm in width of the end portion of one surface is disposed on the end portion of the iron alloy sheet sample subjected to the above treatment thereby contacting with the portion measuring 12 mm in length and 20 mm, and thus this portion is bonded. After cooling the mold to 80° C. or lower, the obtained iron alloy article was removed.

Furthermore, the samples of Examples 2-1 to 2-4, 2-9 to 2-28 and 2-34 to 2-45, and the samples of Comparative Examples 2-1 to 2-4, 2-7 and 2-8 subjected to the above treatment were disposed in a mold (the same mold as those of Examples 1 to 3) heated to 200° C., and injection molding was performed using a resin shown in Table 2 under conditions shown below so that a portion of the surface (a portion measuring 12 mm in length and 20 mm same as Examples 1 to 3) is bonded with the resin (a sheet measuring 80 mm in length, 20 mm in width and 3 mm in thickness same as Examples 1 to 3) to obtain samples of the iron alloy article.

In the samples of Examples 2-1, 2-9, 2-13, 2-17, 2-21, 2-25, 2-34, 2-37 and 2-41, and the samples of Comparative Examples 2-1 and 2-7, injection molding was performed at a resin temperature of 220° C. using an ABS resin (STYLAC(R)-ABS general-purpose 026) manufactured by Asahi Kasei Chemicals Corporation.

In the samples of Examples 2-2, 2-10, 2-14, 2-18, 2-22, 2-26 and 2-38, injection molding was performed at a resin temperature of 270° C. using a PC/ABS resin (Iupilon MB2215R) manufactured by Mitsubishi Engineering-Plastics Corporation.

In the samples of Examples 2-3, 2-11, 2-15, 2-19, 2-23, 2-27, 2-35, 2-39, 2-42 and 2-44, and the samples of Comparative Examples 2-2 to 2-4 and 2-8, injection molding was performed at a resin temperature of 295° C. using a 66 nylon (AMILAN CM3001-N) manufactured by Toray Industries Inc.

In the samples of Examples 2-4, 2-12, 2-16, 2-20, 2-24, 2-28, 2-36, 2-40, 2-43 and 2-45, injection molding was performed at a resin temperature of 230° C. using a PTEE elastomer resin (PRIMALLOY B1600N) manufactured by Mitsubishi Chemical Corporation.

The samples of Examples 2-5 to 2-8, 2-29 to 2-33 and 2-46 subjected to the above treatment were fixed by a heat-resistant tape so as to contact with a resin sheet of the kind shown in Table 1. The samples fixed by the heat-resistant tape was disposed on a heating element set at a resin melting point (fusible temperature) of each resin and thermally fused by pressing the samples from upward by a load of 9 kgf to obtain iron alloy article samples having the same shape as that of the iron alloy article sample obtained by the above injection molding. Details of the resin sheets used are shown below.

In Examples 2-5 and 2-29, the samples were fixed using a resin sheet of an ABS resin (STYLAC(R)-ABS general-purpose 026) manufactured by Asahi Kasei Chemicals Corporation so as to obtain the above shape, and the obtained samples were placed on a heating element set at 230° C. and then thermally fused to obtain iron alloy article samples.

In Example 2-30, the sample was fixed using a resin sheet of PC/ABS resin (Iupilon MB2215R) manufactured by Mitsubishi. Engineering-Plastics. Corporation so as to obtain the above shape, and the obtained sample was placed on a heating element set at 260° C. and then thermally fused to obtain an iron alloy article sample.

In Examples 2-6, 2-31 and 2-46, the samples were fixed using a resin sheet of 66 nylon (AMILAN CM3001-N) manufactured by Toray Industries Inc. so as to obtain the above shape and the obtained samples were placed on a heating element set at 290° C. and then thermally fused to obtain iron alloy article samples.

In Examples 2-7 and 2-32, the samples were fixed using a resin sheet of a PPS resin (FORTRON PPS1140A64) manufactured by Polyplastics Co. Ltd. so as to obtain the above shape and the obtained samples were placed on a heating element set at 320° C. and then thermally fused to obtain iron alloy article samples.

In Examples 2-8 and 2-33, the samples were fixed using a resin sheet of a PTEE elastomer resin (PRIMALLOY 81600N) manufactured by Mitsubishi Chemical Corporation so as to obtain the above shape and the obtained samples were placed on a heating element set at 230° C. and then thermally fused to obtain iron alloy article samples.

Using a conventionally known epoxy resin-based adhesive which is excellent in peel resistance as the samples of Comparative Examples of a 90 degree peel strength test described hereinafter, the sample of Comparative Examples 2-5 and 2-6 were produced by the following procedure.

On the samples of Comparative Examples 2-5 and 2-6 with a coating of the above alkoxysilane-containing triazinethiol derivative formed thereon, a two-pack room temperature-curable epoxy resin-based adhesive (EP330) manufactured by Cemedine Co. Ltd. was coated. A resin plate of a PTEE elastomer resin (PRIMALLOY B1600N) manufactured by Mitsubishi Chemical Corporation was bonded on the samples of Comparative Examples 2-5 and 2-6 and then allowed to stand at room temperature for 24 hours to obtain an iron alloy article sample.

(5) Evaluation of Strength

The strength of the thus obtained iron alloy samples according to Examples 1-1 to 1-3 and 2-1 to 2-46, and Comparative Examples 1-1, 1-2 and 2-1 to 2-8 was evaluated.

Using the iron alloy article sample of Examples 1-1 to 1-3, 2-1 to 2-3, 2-5 to 2-7, 2-9 to 2-11, 2-13 to 2-15, 2-17 to 2-19, 2-21 to 2-23, 2-25 to 2-27, 2-29 to 2-32, 2-34, 2-35, 2-37 to 2-40, 2-42, 2-44 and 2-46, and Comparative Examples 1-1, 1-2, 2-1 to 2-4, 2-7 and 2-8 as tensile test specimens, the bonding strength was evaluated by a tensile test.

Using the iron alloy article samples of Examples 2-4, 2-8, 2-12, 2-16, 2-20, 2-24, 2-28, 2-33, 2-36, 2-41, 2-43 and 2-45, and Comparative Examples 2-5 and 2-6 as 90 degree peel test pieces, the peel strength was evaluated by the 90 degree peel test.

Using an autograph AG-10TD test machine manufactured by Shimadzu Corporation in the tensile test, a iron sheet portion (iron alloy base material) and an end portion (end portion opposite the bonding portion) of a resin sheet portion (resin) of an iron alloy article sample are grasped by each flat chuck and each sample was tested at a testing speed of 5 mm/min. until fracture occurs. Stress determined by dividing a maximum load up to fracture by a bonding surface area (measuring 12 mm in length and 20 mm in width) was regarded as a bonding strength (tensile shear strength). The test was performed thrice with respect to each sample.

In the 90 degree peel test, the metal base was fixed to a fixed base of a tensile test machine using a fixation jig so that an iron sheet portion (iron alloy base material) and a bonding surface of the resin of the iron alloy article sample becomes horizontal, and the portion apart from the bonding portion of the resin was grasped with a flat chuck. Then, the sample was peeled at a speed of 100 mm/min. by moving the flat chuck in a direction, which makes an angle of 90 degree with the bonding surface, to determine a peel strength (stress determined by dividing a maximum load by the bonding length (length; 20 mm)). The test was performed thrice with respect to each sample.

In Table 2, measurement results of a shear strength of Examples 1-1 to 1-3 and Comparative Examples 1-1 and 1-2 are shown. The results of Table 2 show a maximum value and minimum value of the results obtained by testing about thrice about each sample.

TABLE 2

|  | Example 1-1 | Example 1-2 | Example 1-3 | Comparative Example 1-1 | Comparative Example 1-2 |
| --- | --- | --- | --- | --- | --- |
| Bonding strength (Tensile shear strength) [kgf/cm²] | 84.3-104.6 | 93.0-114.2 | 93.4-100.8 | 0 | 0 |

In Table 3, the shear strength of Examples 2-1 to 2-3, 2-5 to 2-7, 2-9 to 2-11, 2-13 to 2-15, 2-17 to 2-19, 2-21 to 2-23, 2-25 to 2-27, 2-29 to 2-32, 2-34, 2-35, 2-37 to 2-40, 2-42, 2-44 and 2-46 and Comparative Examples 2-1 to 2-4, 2-7 and 2-8 of iron alloy article samples are shown.

The 90 degree peel strength of Examples 2-4, 2-8, 2-12, 2-16, 2-20, 2-24, 2-28, 2-33, 2-36, 2-41, 2-43 and 2-45, and Comparative Examples 2-5 and 2-6 of the iron alloy article sample is also shown in Table 3.

The strength in Table 3 shows an average of results obtained after testing thrice with respect to each sample.

TABLE 3

|  | Tensile shear strength [MPa] | 90 degree peel strength [N/mm] |
| --- | --- | --- |
| Example 2-1 | 10.3 | — |
| Example 2-2 | 8.7 | — |
| Example 2-3 | 10.1 | — |
| Example 2-4 | — | 3.6 |
| Example 2-5 | 7.9 | — |
| Example 2-6 | 8.1 | — |
| Example 2-7 | 6.9 | — |
| Example 2-8 | — | 4.3 |
| Example 2-9 | 9.5 | — |
| Example 2-10 | 7.8 | — |
| Example 2-11 | 8.9 | — |
| Example 2-12 | — | 3.5 |
| Example 2-13 | 9.0 | — |
| Example 2-14 | 8.2 | — |
| Example 2-15 | 8.8 | — |
| Example 2-16 | — | 3.6 |
| Example 2-17 | 5.6 | — |
| Example 2-18 | 6.0 | — |

TABLE 3-continued

|  | Tensile shear strength [MPa] | 90 degree peel strength [N/mm] |
| --- | --- | --- |
| Example 2-19 | 8.0 | — |
| Example 2-20 | — | 3.5 |
| Example 2-21 | 5.2 | — |
| Example 2-22 | 4.5 | — |
| Example 2-23 | 7.3 | — |
| Example 2-24 | — | 3.0 |
| Example 2-25 | 3.1 | — |
| Example 2-26 | 3.3 | — |
| Example 2-27 | 9.2 | — |
| Example 2-28 | — | 3.1 |
| Example 2-29 | 6.7 | — |
| Example 2-30 | 7.1 | — |
| Example 2-31 | 8.2 | — |
| Example 2-32 | 7.8 | — |
| Example 2-33 | — | 3.9 |
| Example 2-34 | 2.8 | — |
| Example 2-35 | 7.0 | — |
| Example 2-36 | — | 2.8 |
| Example 2-37 | 2.0 | — |
| Example 2-38 | 3.0 | — |
| Example 2-39 | 3.0 | — |
| Example 2-40 | 8.8 | — |
| Example 2-41 | — | 3.1 |
| Example 2-42 | 6.2 | — |
| Example 2-43 | — | 2.5 |

TABLE 3-continued

|  | Tensile shear strength [MPa] | 90 degree peel strength [N/mm] |
| --- | --- | --- |
| Example 2-44 | 8.4 | — |
| Example 2-45 | — | 3.0 |
| Example 2-46 | 7.5 | — |
| Comparative Example 2-1 | 0.0 | — |
| Comparative Example 2-2 | 0.0 | — |
| Comparative Example 2-3 | 0.0 | — |
| Comparative Example 2-4 | 0.0 | — |
| Comparative Example 2-5 | — | 1.5 |
| Comparative Example 2-6 | — | 1.2 |
| Comparative Example 2-7 | 0.0 | — |
| Comparative Example 2-8 | 0.0 | — |

In the tensile test, all samples of Examples exhibited an excellent tensile shear strength of 2.8 MPa (27.5 kgf/cm²) or more. In contrast, all samples of Comparative Examples subjected to the tensile test exhibited zero strength. In the samples of Examples, fractures were confirmed on a bonding surface or a resin portion. With respect to the fracture surface (iron alloy sheet side) on the bonding surface, attaching of the resin was observed and it was confirmed that fractures partially occur in the resin.

All samples of Examples subjected to the 90 degree peel test exhibited the 90 degree peel strength of 2.5 N/mm or more. In contrast, all samples of Comparative Examples exhibited the 90 degree peel strength of 1.5 N/mm or less. Namely, the samples of Examples exhibited the 90 degree peel strength which is apparently higher than that of the samples of Comparative Examples.

This application claims priority on Japanese Patent Application No. 2008-164221 in Japan. The application of Japanese Patent Application No. 2008-164221 is incorporated by reference herein.

The invention claimed is:

1. An iron alloy article comprising a base composed of iron or an iron alloy, and a resin bonded to at least a portion of a surface of the base through a dehydrated silanol-containing triazinethiol derivative coating, the iron alloy article further comprising a metal compound film consisting of a phosphate between the base and the dehydrated silanol-containing triazinethiol derivative coating,
wherein the dehydrated silanol-containing triazinethiol derivative coating comprises a hydrated product of an alkoxysilane-containing triazinethiol derivative represented by the following formula 1 or formula 2:

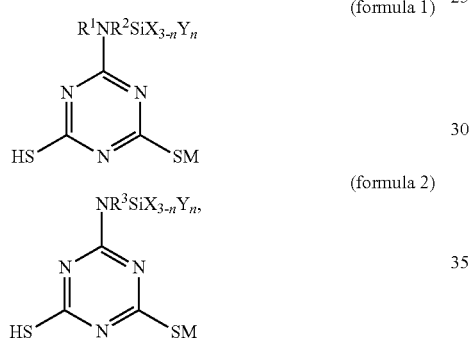

wherein
$R^1$ is selected from the group consisting of H—, $CH_3$—, $C_2H_5$—, $CH_2$=$CHCH_2$—, $C_4H_9$—, $C_6H_5$— and $C_6H_{13}$—,
$R^2$ is selected from the group consisting of —$CH_2CH_2$—, —$CH_2CH_2CH_2$—, —$CH_2CH_2CH_2CH_2CH_2CH_2$—, —$CH_2CH_2SCH_2CH_2$— and —$CH_2CH_2NHCH_2CH_2CH_2$—,
$R^3$ is selected from the group consisting of —$(CH_2CH_2)_2$CHOCONHCH$_2$CH$_2$CH$_2$— and —$(CH_2CH_2)_2$N—CH$_2$CH$_2$CH$_2$—,
X is selected from the group consisting of $CH_3$—, $C_2H_5$—, n-$C_3H_7$—, i-$C_3H_7$—, n-$C_4H_9$—, i-$C_4H_9$— and t-$C_4H_9$—,
Y is an alkoxy group,
n is any one numeral of 1, 2 and 3, and
M is an alkali metal.

2. The iron alloy article according to claim 1, wherein the phosphate is at least one selected from the group consisting of a metal hydrogen phosphate, a metal dihydrogen phosphate and a metal phosphate.

3. The iron alloy article according to claim 1, wherein the phosphate is at least one selected from the group consisting of zinc phosphate, zinc hydrogen phosphate, manganese phosphate, manganese hydrogen phosphate, calcium hydrogen phosphate, calcium dihydrogen phosphate, calcium phosphate, calcium sodium phosphate, iron phosphate and zirconium phosphate.

4. A method for producing an iron alloy article in which a resin is bonded to at least a portion of an iron alloy base composed of iron or an iron alloy using an alkoxysilane-containing triazinethiol derivative, the method comprising the steps of:
forming a metal compound film on at least a portion of a surface of the iron alloy base using a solution containing at least one selected from the group consisting of phosphoric acid and a phosphate;
bringing an alkoxysilane-containing triazinethiol derivative into contact with the metal compound film; and
bonding a resin to the portion contacted with the alkoxysilane-containing triazinethiol derivative,
wherein the alkoxysilane-containing triazinethiol derivative is represented by the following formula 1 or formula 2:

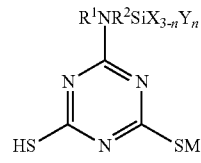

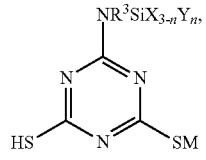

wherein
$R^1$ is selected from the group consisting of H—, $CH_3$—, $C_2H_5$—, $CH_2$=$CHCH_2$—, $C_4H_9$—, $C_6H_5$— and $C_6H_{13}$—,
$R^2$ is selected from the group consisting of —$CH_2CH_2$—, —$CH_2CH_2CH_2$—, —$CH_2CH_2CH_2CH_2CH_2CH_2$—, —$CH_2CH_2SCH_2CH_2$— and —$CH_2CH_2NHCH_2CH_2CH_2$—,
$R^3$ is selected from the group consisting of —$(CH_2CH_2)_2$CHOCONHCH$_2$CH$_2$CH$_2$— and —$(CH_2CH_2)_2$N—CH$_2$CH$_2$CH$_2$—,
X is selected from the group consisting of $CH_3$—, $C_2H_5$—, n-$C_3H_7$—, n-$C_4H_9$—, i-$C_4H_9$— and t-$C_4H_9$—,
Y is an alkoxy group,
n is any one numeral of 1, 2 and 3, and
M is an alkali metal.

5. The method according to claim 4, wherein the solution contains at least one selected from phosphoric acid, a metal hydrogen phosphate, a metal dihydrogen phosphate and a metal phosphate.

6. The method according to claim 4, wherein the solution contains at least one selected from zinc phosphate, zinc hydrogen phosphate, manganese phosphate, calcium hydrogen phosphate, calcium dihydrogen phosphate, calcium sodium phosphate, calcium phosphate and zirconium phosphate.

7. An iron alloy member comprising a base composed of iron or an iron alloy, and a dehydrated silanol-containing triazinethiol derivative or a silanol-containing triazinethiol derivative coated on at least a portion of a surface of the base, the iron alloy member further comprising a metal compound film consisting of a phosphate between the base and the dehydrated silanol-containing triazinethiol derivative coating or the silanol-containing triazinethiol derivative coating, wherein the dehydrated silanol-containing triazinethiol derivative is a hydrated product of an alkoxysilane-containing triazinethiol derivative represented by the following formula 1 or formula 2, or the silanol-containing triazinethiol derivative is an alkoxysilane-containing triazinethiol derivative represented by the following formula 1 or formula 2:

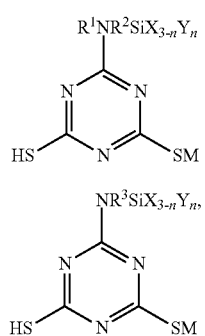
(formula 1)

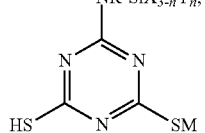
(formula 2)

wherein
R$^1$ is selected from the group consisting of H—, CH$_3$—, C$_2$H$_5$—, CH$_2$=CHCH$_2$—, C$_4$H$_9$—, C$_6$H$_5$— and C$_6$H$_{13}$—,
R$^2$ is selected from the group consisting of —CH$_2$CH$_2$—, —CH$_2$CH$_2$CH$_2$—, —CH$_2$CH$_2$CH$_2$CH$_2$CH$_2$CH$_2$—, —CH$_2$CH$_2$SCH$_2$CH$_2$— and —CH$_2$CH$_2$NHCH$_2$CH$_2$CH$_2$—,
R$^3$ is selected from the group consisting of —(CH$_2$CH$_2$)$_2$CHOCONHCH$_2$CH$_2$CH$_2$— and —(CH$_2$CH$_2$)$_2$N—CH$_2$CH$_2$CH$_2$—,
X is selected from the group consisting of CH$_3$—, C$_2$H$_5$—, n-C$_3$H$_7$—, i-C$_3$H$_7$—, n-C$_4$H$_9$—, i-C$_4$H$_9$— and t-C$_4$H$_9$—,
Y is an alkoxy group,
n is any one numeral of 1, 2 and 3, and
M is an alkali metal.

8. The iron alloy member according to claim 7, wherein the phosphate is at least one selected from the group consisting of a metal hydrogen phosphate, a metal dihydrogen phosphate and a metal phosphate.

9. The iron alloy member according to claim 7, wherein the phosphate is at least one selected from the group consisting of zinc phosphate, zinc hydrogen phosphate, manganese phosphate, manganese hydrogen phosphate, calcium hydrogen phosphate, calcium dihydrogen phosphate, calcium phosphate, calcium sodium phosphate, iron phosphate and zirconium phosphate.

10. A method for producing an iron alloy member in which an alkoxysilane-containing triazinethiol derivative is brought into contact with at least a portion of an iron alloy base composed of iron or an iron alloy, the method comprising the steps of:

forming a metal compound film consisting of a phosphate on at least a portion of a surface of the iron alloy base using a solution containing at least one selected from the group consisting of phosphoric acid and a phosphate; and bringing an alkoxysilane-containing triazinethiol derivative into contact with the metal compound film, wherein the alkoxysilane-containing triazinethiol derivative is represented by the following formula 1 or formula 2:

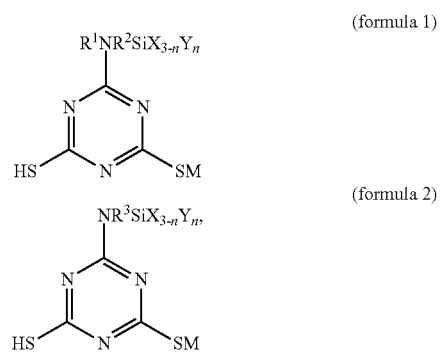

wherein
R$^1$ is selected from the group consisting of H—, CH$_3$—, C$_2$H$_5$—, CH$_2$=CHCH$_2$—, C$_4$H$_9$—, C$_6$H$_5$— and C$_6$H$_{13}$—,
R$^2$ is selected from the group consisting of —CH$_2$CH$_2$—, —CH$_2$CH$_2$CH$_2$—, —CH$_2$CH$_2$CH$_2$CH$_2$CH$_2$CH$_2$—, —CH$_2$CH$_2$SCH$_2$CH$_2$— and —CH$_2$CH$_2$NHCH$_2$CH$_2$CH$_2$—,
R$^3$ is selected from the group consisting of —(CH$_2$CH$_2$)$_2$CHOCONHCH$_2$CH$_2$CH$_2$— and —(CH$_2$CH$_2$)$_2$N—CH$_2$CH$_2$CH$_2$—,
X is selected from the group consisting of CH$_3$—, C$_2$H$_5$—, n-C$_3$H$_7$—, i-C$_3$H$_7$—, n-C$_4$H$_9$—, i-C$_4$H$_9$— and t-C$_4$H$_9$—,
Y is an alkoxy group,
n is any one numeral of 1, 2 and 3, and
M is an alkali metal.

11. The method according to claim 10, wherein the solution contains at least one selected from phosphoric acid, a metal hydrogen phosphate, a metal dihydrogen phosphate and a metal phosphate.

12. The method according to claim 10, wherein the solution contains at least one selected from zinc phosphate, zinc hydrogen phosphate, manganese phosphate, manganese hydrogen phosphate, calcium hydrogen phosphate, calcium dihydrogen phosphate, calcium sodium phosphate, calcium phosphate and zirconium phosphate.

* * * * *